United States Patent
Oya (10) Patent No.: US 10,293,856 B2
(45) Date of Patent: May 21, 2019

(54) VEHICULAR STEERING SYSTEM

(71) Applicant: JTEKT CORPORATION, Osaka-shi, Osaka (JP)

(72) Inventor: Toshiaki Oya, Sakai (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 15/215,761

(22) Filed: Jul. 21, 2016

(65) Prior Publication Data

US 2017/0029013 A1  Feb. 2, 2017

(30) Foreign Application Priority Data

Jul. 28, 2015 (JP) ................. 2015-148688

(51) Int. Cl.
    *B62D 5/00* (2006.01)
    *B62D 15/02* (2006.01)

(52) U.S. Cl.
    CPC ........... *B62D 15/027* (2013.01); *B62D 5/006* (2013.01); *B62D 15/0285* (2013.01)

(58) Field of Classification Search
    CPC .. B62D 15/027; B62D 15/0285; B62D 5/006; B62D 6/00
    See application file for complete search history.

(56) References Cited

U.S. PATENT DOCUMENTS

| | | | | |
|---|---|---|---|---|
| 5,236,335 A * | 8/1993 | Takeuchi | ............... | B62D 5/001 180/404 |
| 5,251,135 A * | 10/1993 | Serizawa | ............... | B62D 5/001 180/402 |
| 6,059,068 A * | 5/2000 | Kato | ............... | B62D 5/006 180/402 |
| 6,072,293 A * | 6/2000 | Shimizu | ............... | B62D 5/0463 318/432 |
| 6,523,637 B1 * | 2/2003 | Nakano | ............... | B62D 5/003 180/402 |
| 7,191,864 B2 * | 3/2007 | Sugitani | ............... | B62D 6/008 180/402 |

(Continued)

FOREIGN PATENT DOCUMENTS

| | | |
|---|---|---|
| EP | 0854075 A2 | 7/1998 |
| JP | 2012-040977 A | 3/2012 |
| WO | 2014/054474 A1 | 4/2014 |

OTHER PUBLICATIONS

Mar. 23, 2017 Extended Search Report issued in European Patent Application No. 16181242.5.

(Continued)

*Primary Examiner* — Joseph M Rocca
*Assistant Examiner* — Michael R Stabley
(74) *Attorney, Agent, or Firm* — Oliff PLC (57) ABSTRACT

In a vehicular steering system, a steering wheel (steering member) operated for steering and a steering operation mechanism are not mechanically coupled together, and the steering operation mechanism is driven by a steering operation motor. The vehicular steering system includes a reaction force motor that applies a reaction force to the steering member, and a reaction force motor control unit that controls the reaction force motor. The reaction force motor control unit includes a torque limiter that limits a current flowing through the reaction force motor to a predetermined value or smaller during automatic operation.

4 Claims, 6 Drawing Sheets

(56) References Cited

U.S. PATENT DOCUMENTS

| | | | | |
|---|---|---|---|---|
| 7,234,563 B2* | 6/2007 | Ogawa | B62D 5/046 | 180/402 |
| 7,246,679 B2* | 7/2007 | Kasahara | B62D 5/003 | 180/402 |
| 7,308,346 B2* | 12/2007 | Sugitani | B62D 6/002 | 180/402 |
| 7,395,138 B2* | 7/2008 | Kondoh | B60K 26/021 | 701/1 |
| 7,457,694 B2* | 11/2008 | Hijikata | B60W 40/02 | 340/576 |
| 7,708,108 B2* | 5/2010 | Miyasaka | B62D 5/001 | 180/402 |
| 7,971,678 B2* | 7/2011 | Mori | B62D 5/003 | 180/402 |
| 8,816,878 B2* | 8/2014 | Kadowaki | B62D 15/0285 | 340/438 |
| 8,994,521 B2* | 3/2015 | Gazit | B62D 1/28 | 340/425.5 |
| 9,020,702 B2* | 4/2015 | Suzuki | B62D 5/0469 | 701/41 |
| 2011/0260887 A1* | 10/2011 | Toledo | B62D 15/0285 | 340/932.2 |
| 2013/0162829 A1* | 6/2013 | Kadowaki | B62D 15/028 | 348/148 |
| 2014/0343791 A1* | 11/2014 | Suzuki | B62D 5/0469 | 701/41 |

OTHER PUBLICATIONS

Nov. 21, 2018 Office Action issued in European Patent Application No. 16181242.5.

* cited by examiner

VEHICULAR STEERING SYSTEM

INCORPORATION BY REFERENCE

The disclosure of Japanese Patent Application No. 2015-148688 filed on Jul. 28, 2015 including the specification, drawings and abstract, is incorporated herein by reference in its entirety.

BACKGROUND OF THE INVENTION

1. Field of the Invention

The invention relates to a vehicular steering system in which a steering member operated for steering and a steering operation mechanism are not mechanically coupled together and in which the steering operation mechanism is driven by a steering operation motor.

2. Description of Related Art

A steer-by-wire system has been proposed in which a steering wheel as a steering member and a steering operation mechanism are not mechanically coupled together such that a driving force of a steering operation motor controlled in accordance with operation of the steering wheel is transmitted to the steering operation mechanism. A parking assist apparatus has been proposed in which, when parked as in "parking in a garage" or "tandem parking", a vehicle is automatically parked at a target parking position without the need for a driver to steer the steering wheel.

In a vehicle with a steer-by-wire system mounted therein, while parking assistance (automatic steering operation) is being performed by the parking assist apparatus, the steering wheel rotates in synchronism with the automatic steering operation. At this time, an unforeseen situation may occur; for example, the driver's clothes may wrap around the steering wheel or the steering wheel may collide against the driver's hand. Thus, a parking assist apparatus for a vehicle with a steer-by-wire system mounted therein has been proposed which keeps the steering wheel in a neutral position while parking assistance is being performed (see Japanese Patent Application Publication No. 2012-40977 (JP 2012-40977 A)).

SUMMARY OF THE INVENTION

An object of the invention is to provide a vehicular steering system that uses a novel method to allow suppression of an unforeseen situation resulting from rotation of a steering member during automatic operation.

An aspect of the invention provides a vehicular steering system in which a steering member operated for steering and a steering operation mechanism are not mechanically coupled together and in which the steering operation mechanism is driven by a steering operation motor. The vehicular steering system includes a reaction force motor that applies a reaction force to the steering member and a reaction force motor control unit that controls the reaction force motor. The reaction force motor control unit includes a current limiting unit that limits a current flowing through the reaction force motor to a predetermined value or smaller during automatic operation.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
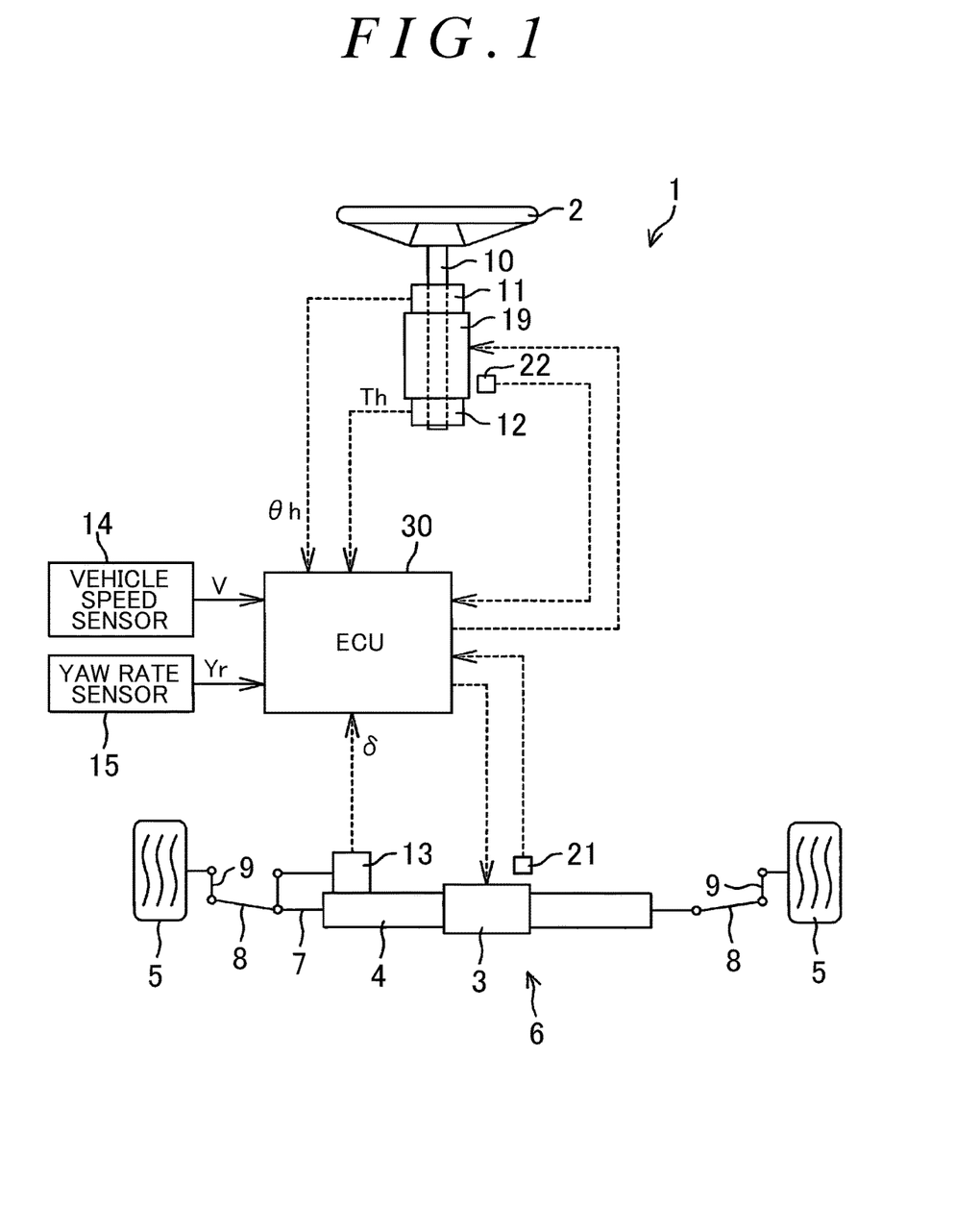
FIG. 1 is a diagram illustrating a configuration of a vehicular steering system according to an embodiment of the invention.

An embodiment of the invention will be described below in detail with reference to the attached drawings. FIG. 1 is a diagram illustrating a configuration of a vehicular steering system according to an embodiment of the invention. FIG. 1 depicts a configuration of a steer-by-wire system. A vehicular steering system 1 includes a steering wheel 2, a steering operation motor 3, and a steering gear 4. The steering wheel 2 is a steering member that is operated for steering by a driver. The steering operation motor 3 is driven in accordance with a rotating operation for the steering wheel 2. The steering gear 4 transmits a driving force of the steering operation motor 3 to a right and a left front wheels 5 serving as steered wheels. The steering wheel 2 and a steering operation mechanism 6 including the steering operation motor 3 are not mechanically coupled together, so that an operation torque applied to the steering wheel 2 is not mechanically transmitted to the steering operation mechanism 6. The steering operation motor 3 is controlled to be driven in accordance with the amount of operation (steering angle or steering torque) of the steering wheel 2 so that the wheels 5 are steered.

The steering operation motor 3 includes an electric motor such as a brushless motor. In the present embodiment, the steering operation motor 3 includes a brushless motor. The steering operation motor 3 is provided with a rotation angle sensor 21 such as a resolver for detecting the rotation angle of a rotor of the steering operation motor 3. The steering gear 4 has a motion converting mechanism that converts a rotary motion of an output shaft of the steering operation motor 3 into a linear motion of a steering rod 7 (a linear motion in a lateral direction of the vehicle). The motion of the steering rod 7 is transmitted to tie rods 8 and to the wheels 5 via knuckle arms 9 to change a toe angle (steered angle) of the wheels 5. In other words, the steering operation mechanism 6 includes the steering operation motor 3, the steering gear 4, the steering rod 7, the tie rods 8, and the knuckle arms 9. As the steering gear 4, a well-known steering gear may be used. A configuration of the steering gear 4 is not limited so long as the steering gear 4 allows the motion of the steering operation motor 3 to be transmitted to the wheels 5 so as to change the steered angle.

In the present embodiment, rotation of the steering operation motor 3 in a forward direction changes the steered angle of the wheels 5 in such a direction that the vehicle turns right (right-turn direction). Rotation of the steering operation motor 3 in the opposite direction changes the steered angle of the wheels 5 in such a direction that the vehicle turns left (left-turn direction). The steering wheel 2 is coupled to a rotating shaft 10 rotatably supported on a vehicle body side.

The rotating shaft 10 is provided with a reaction force motor 19 that generates a reaction force torque (operational reaction force) that acts on the steering wheel 2. The reaction force motor 19 includes an electric motor such as a brushless motor which has an output shaft integral with the rotating shaft 10. In the present embodiment, the reaction force motor 19 includes a brushless motor. The reaction force motor 19 is provided with a rotation angle sensor 22 such as a resolver for detecting the rotation angle of a rotor (rotor angle) of the reaction force motor 19.

A steering angle sensor 11 is provided around the rotating shaft 10 to detect the rotation angle of the rotating shaft 10 (the steering angle θh of the steering wheel 2). In the present embodiment, the steering angle sensor 11 detects the amount of forward or backward rotations (rotation angle) of the rotating shaft 10 with respect to the neutral position (reference position) of the rotating shaft 10. The steering angle sensor 11 outputs the amount of clockwise rotation with respect to the neutral position, for example, as a positive value and outputs the amount of counterclockwise rotation with respect to the neutral position, for example, as a negative value.

A torque sensor 12 is provided around the rotating shaft 10 to detect a steering torque Th applied to the steering wheel 2 by the driver. In the present embodiment, for the steering torque Th detected by the torque sensor 12, a torque for clockwise steering is detected as a positive value, and a torque for counterclockwise steering is detected as a negative value. The magnitude of the steering torque increases as the absolute value of the steering torque increases.

A steered angle sensor 13 is provided near the steering gear 4 to detect the steered angle δ of the wheels 5. The steered angle sensor 13 includes, for example, a potentiometer that detects the operation amount of the steering rod 7, which corresponds to the steered angle δ. The vehicle is also provided with a vehicle speed sensor 14 for detecting a vehicle speed V, a yaw rate sensor 15 for detecting a yaw rate Yr, and the like.

Figure 2:
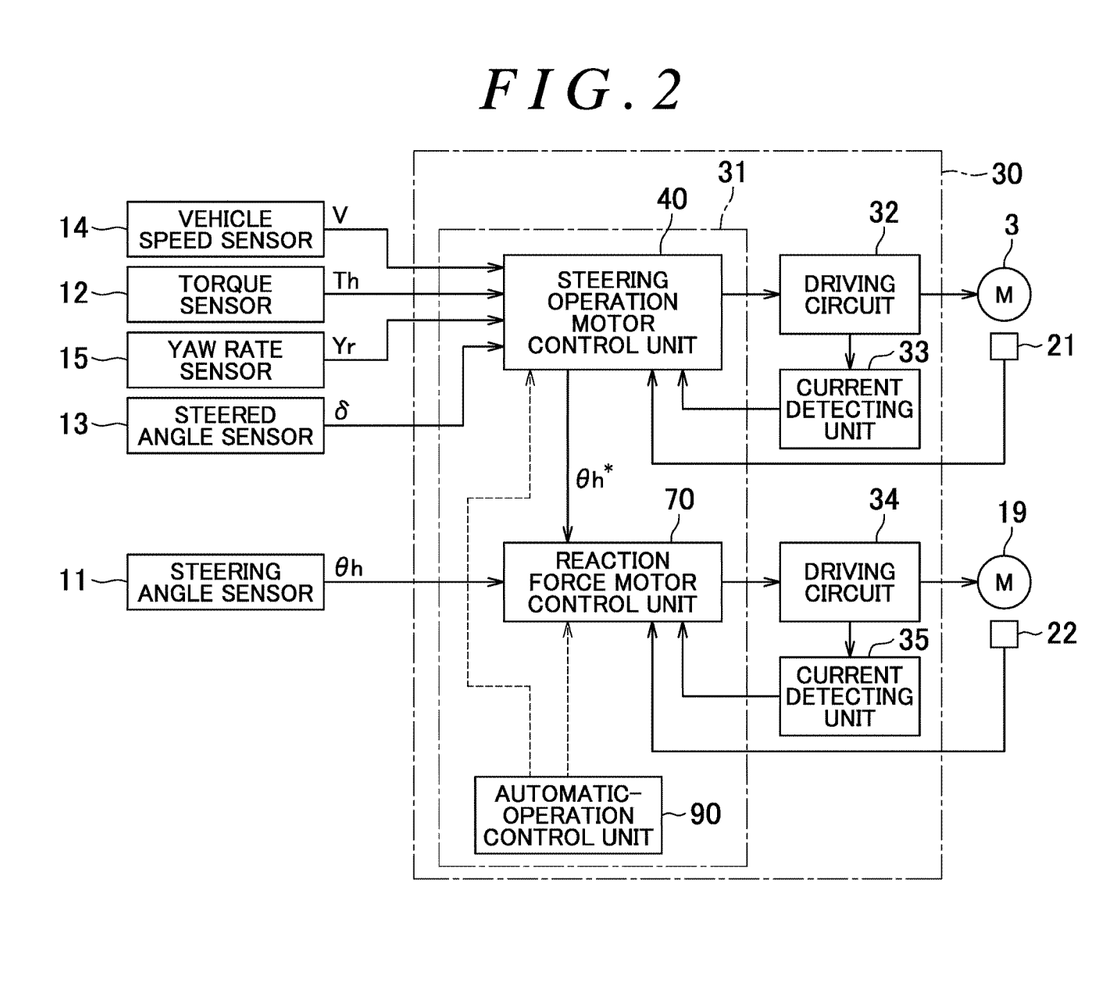
FIG. 2 is a block diagram illustrating an electric configuration of an ECU.

The steering angle sensor 11, the torque sensor 12, the vehicle speed sensor 14, the yaw rate sensor 15, and rotation angle sensors 21 and 22 are each connected to an electronic control unit (ECU) 30. The ECU 30 controls the steering operation motor 3 and the reaction force motor 19. FIG. 2 is a block diagram illustrating an electric configuration of the ECU 30.

The ECU 30 includes a microcomputer 31, a driving circuit (inverter circuit) 32, a current detecting unit 33, a driving circuit (inverter circuit) 34, and a current detecting unit 35. The driving circuit 32 is controlled by the microcomputer 31 to supply power to the steering operation motor 3. The current detecting unit 33 detects a motor current flowing through the steering operation motor 3. The driving circuit 34 is controlled by the microcomputer 31 to supply power to the reaction force motor 19. The current detecting unit 35 detects a motor current flowing through the reaction force motor 19.

The microcomputer 31 includes a CPU and memory (ROM, RAM, nonvolatile memory, and the like). The microcomputer 31 functions as a plurality of function processing units by executing predetermined programs. The function processing units include a steering operation motor control unit 40, a reaction force motor control unit 70, and an automatic-operation control unit 90. The steering operation motor control unit 40 controls the steering operation motor 3. The reaction force motor control unit 70 controls the reaction force motor 19. The automatic-operation control unit 90 allows a steering operation to be automatically performed regardless of operation of the steering wheel 2. In the present embodiment, the automatic-operation control unit 90 (parking assist apparatus) allows parking such as "parking in a garage" and "tandem parking" to be automatically performed. The automatic-operation control unit 90 may have, instead of or in addition to the parking assist apparatus, an automatic operation function other than the parking assist apparatus. A mode in which a steering operation is performed based on operation of the steering wheel 2 is sometimes referred to as a normal mode. A mode in which a steering operation is automatically performed by the automatic-operation control unit 90 is sometimes referred to as an automatic operation mode.

In the normal mode, the steering operation motor control unit 40 implements steering operation control in accordance with a steering state based on the vehicle speed V, the steering torque Th, the yaw rate Yr, and the steered angle δ. The vehicle speed V is detected by the vehicle speed sensor 14. The steering torque Th is detected by the torque sensor 12. The yaw rate Yr is detected by the yaw rate sensor 15. The steered angle δ is detected by the steered angle sensor 13. In the automatic operation mode, the steering operation motor control unit 40 implements automatic steering operation control by controlling the driving circuit 32 based on a target steering angle (target steered angle) and the steered angle δ. The target steering angle is provided by the automatic-operation control unit 90.

Figure 3:
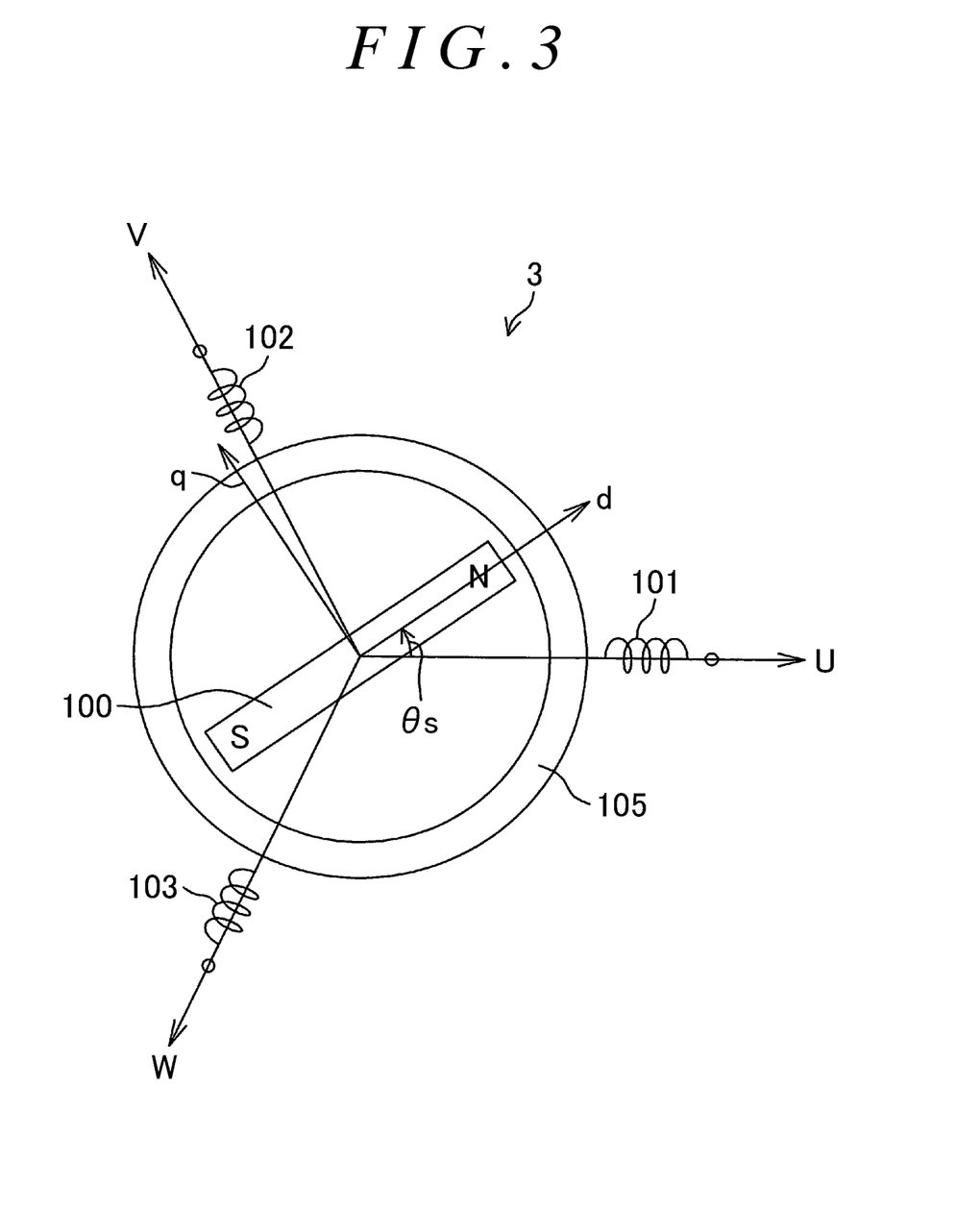
FIG. 3 is a diagram illustrating a configuration of a steering operation motor.

The reaction force motor control unit 70 implements reaction force control in accordance with the steering state by controlling the driving circuit 34 based on a target steering angle θh* and a steering angle θh. The target steering angle θh* is provided by the steering operation motor control unit 40. The steering angle θh is detected by the steering angle sensor 11. As illustrated in FIG. 3, the steering operation motor 3 is, for example, a three-phase brushless motor. The steering operation motor 3 includes a rotor 100 serving as a field system and a stator 105 including stator windings 101, 102, and 103 for a U-phase, a V-phase, and a W-phase, respectively. The steering operation motor 3 may be of an inner rotor type in which a stator is arranged outside a rotor so as to face the rotor, or may be of an outer rotor type in which a stator is arranged inside a tubular rotor so as to face the rotor.

Three-phase fixed coordinates (UVW coordinate system) are defined for which a U-axis, a V-axis, and a W-axis are taken in the directions of the stator windings 101, 102, and 103 for the respective phases. A two-phase rotating coordinate system (a dq coordinate system or an actual rotating coordinate system) is defined in which a d-axis (magnetic-pole axis) is taken in a magnetic-pole direction of the rotor 100 and in which a q-axis (torque axis) is taken in a direction perpendicular to the d-axis in a rotating plane of the rotor 100. The dq coordinate system is a rotating coordinate system that rotates along with the rotor 100. In the dq coordinate system, only a q-axis current contributes to torque generation performed by the rotor 100. Consequently, the d-axis current may be set to zero, and the q-axis current may be controlled in accordance with a desired torque. The rotation angle (rotor angle (electrical angle)) $\theta_S$ of the rotor 100 is the rotation angle of the d-axis with respect to the U-axis. The dq coordinate system is an actual rotating coordinate system in accordance with the rotor angle $\theta_S$. The use of the rotor angle $\theta_S$ allows coordinate conversion between the UVW coordinate system and the dq coordinate system.

Figure 4:
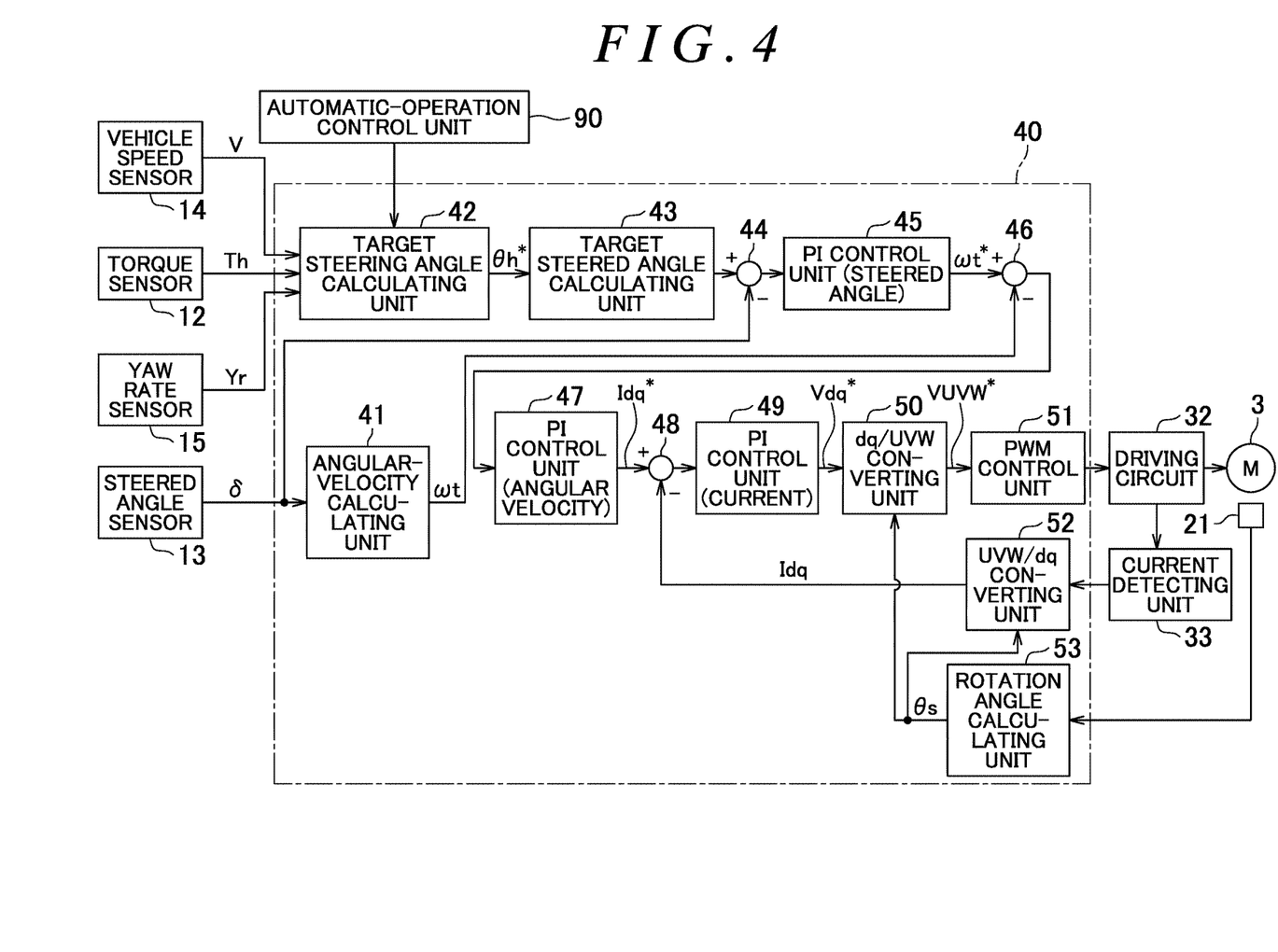
FIG. 4 is a block diagram illustrating a configuration example of a steering operation motor control unit.

The reaction force motor 19 is, for example, a three-phase brushless motor and has a structure similar to that of the steering operation motor 3. FIG. 4 is a block diagram illustrating a configuration example of the steering operation motor control unit 40. The steering operation motor control unit 40 includes an angular-velocity calculating unit 41, a target steering angle calculating unit 42, a target steered angle calculating unit 43, an angular-deviation calculating unit 44, a proportional integral (PI) control unit 45, an angular-velocity deviation calculating unit 46, a PI control unit 47, a current deviation calculating unit 48, a PI control unit 49, dq/UVW converting unit 50, a pulse width modulation (PWM) control unit 51, a UVW/dq converting unit 52, and a rotation angle calculating unit 53.

The target steering angle calculating unit 42 calculates the target steering angle θh*, which is a target value of the rotation angle of the rotating shaft 10, based on the vehicle speed V, the steering torque Th, and the yaw rate Yr. The vehicle speed V is detected by the vehicle speed sensor 14. The steering torque Th is detected by the torque sensor 12. The yaw rate Yr is detected by the yaw rate sensor 15. In other words, the target steering angle calculating unit 42 calculates the target steering angle θh* based on detection values indicative of the steering state (steering state detection value).

The target steered angle calculating unit 43 calculates a target steered angle δ* that is a target value of the steered angle, based on the target steering angle θh* calculated by the target steering angle calculating unit 42. The target steered angle δ* calculated by the target steered angle calculating unit 43 is provided to the angular-deviation calculating unit 44. The angular-deviation calculating unit 44 calculates a deviation Δδ (=δ*−δ) between the target steered angle δ* calculated by the target steered angle calculating unit 43 and the steered angle δ detected by the steered angle sensor 13.

The PI control unit 45 executes PI calculation on the angular deviation Δδ calculated by the angular-deviation calculating unit 44 to determine a target steered angle velocity ωt* that is a target value of a steered angle velocity. The target steered angle velocity ωt* calculated by the PI control unit 45 is provided to the angular-velocity deviation calculating unit 46. The angular-velocity calculating unit 41 executes time differentiation on the steered angle δ detected by the steered angle sensor 13 to determine an angular velocity ωt of the steered angle δ (steered angle velocity). The steered angle velocity ωt calculated by the angular-velocity calculating unit 41 is provided to the angular-velocity deviation calculating unit 46.

The angular-velocity deviation calculating unit 46 calculates a deviation Δωt (=ωt*−ωt) between the target steered angle velocity ωt* calculated by the PI control unit 45 and the steered angle velocity ωt calculated by the angular-velocity calculating unit 41. The PI control unit 47 executes PI calculation on the steered angle deviation Δωt calculated by the angular-velocity deviation calculating unit 46 to determine target currents that are target values of currents to be passed through the coordinate axes of the dq coordinate system. Specifically, the PI control unit 47 calculates a target d-axis current $I_d^*$ and a target q-axis current $I_q^*$ (hereinafter expressed as "target two-phase current $I_{dq}^*$" when collectively referred to). More specifically, the PI control unit 47 calculates the target q-axis current $I_q^*$ such that the target q-axis current $I_q^*$ has a significant value, while setting the target d-axis current $I_d^*$ to zero. The target two-phase current $I_{dq}^*$ calculated by the PI control unit 47 is provided to the current deviation calculating unit 48.

The rotation angle calculating unit 53 calculates the rotation angle (electrical angle; hereinafter referred to as the "rotor angle $θ_S$") of the rotor of the steering operation motor 3 based on an output signal from the rotation angle sensor 21. The current detecting unit 33 detects a U-phase current $I_U$, a V-phase current $I_V$, and a W-phase current $I_W$ (hereinafter expressed as "three-phase detected current $T_{UVW}$" when collectively referred to). The three-phase detected current $T_{UVW}$ detected by the current detecting unit 33 is provided to the UVW/dq converting unit 52.

The UVW/dq converting unit 52 converts the three-phase detected current $I_{UVW}$ of the UVW coordinate system (the U-phase current $I_U$, the V-phase current $I_V$, and the W-phase current $I_W$), detected by the current detecting unit 33, into two-phase detected currents $I_d$ and $I_q$ of the dq coordinate system (hereinafter expressed as "two-phase detected current $I_{dq}$" when collectively referred to). The currents are provided to the current deviation calculating unit 48. The rotor angle $θ_S$ calculated by the rotation angle calculating unit 53 is used for the coordinate conversion in the UVW/dq converting unit 52.

The current deviation calculating unit 48 calculates a deviation between the target two-phase current $I_{dq}^*$ calculated by the PI control unit 47 and the two-phase detected current $I_{dq}$ provided by the UVW/dq converting unit 52. More specifically, the current deviation calculating unit 48 calculates the deviation of a d-axis detected current $I_d$ with respect to the target d-axis current $I_d^*$ and the deviation of a q-axis detected current $I_q$ with respect to the target q-axis current $I_q^*$. The deviations are provided to the PI control unit 49.

The PI control unit 49 executes PI calculation on the current deviation calculated by the current deviation calculating unit 48. This results in a target two-phase voltage $V_{dq}^*$ (a target d-axis voltage $V_d^*$ and a target q-axis voltage $V_q^*$) to be applied to the steering operation motor 3. The target two-phase voltage $V_{dq}^*$ is provided to the dq/UVW converting unit 50. The dq/UVW converting unit 50 converts the target two-phase voltage $V_{dq}^*$ into a target three-phase voltage $V_{UVW}^*$. The rotor angle $θ_S$ calculated by the rotation angle calculating unit 53 is used for this coordinate conversion. The target three-phase voltage $V_{UVW}^*$ is a combination of a target U-phase voltage $V_U^*$, a target V-phase voltage $V_V^*$, and a target W-phase voltage $V_W^*$. The target three-phase voltage $V_{UVW}^*$ is provided to the PWM control unit 51.

The PWM control unit 51 generates a U-phase PWM control signal, a V-phase PWM control signal, and a W-phase PWM control signal having duties corresponding to the target U-phase voltage $V_U^*$, the target V-phase voltage $V_V^*$, and the target W-phase voltage $V_W^*$, respectively, and supplies these PWM control signals to the driving circuit 32. The driving circuit 32 is a three-phase inverter circuit corresponding to the U-phase, the V-phase, and the W-phase. Power devices included in the inverter circuit are controlled using PWM control signals provided by the PWM control unit 51. Consequently, voltages corresponding to the target three-phase voltage $V_{UVW}^*$ are applied to the stator windings 101, 102, and 103 for the respective phases in the steering operation motor 3.

The angular-deviation calculating unit 44 and the PI control unit 45 are included in an angle feedback control unit. The angle feedback control unit acts to control the steered angle δ of the wheels 5 so as to make the steered angle δ closer to the target steered angle δ* calculated by the target steered angle calculating unit 43. The angular-velocity deviation calculating unit 46 and the PI control unit 47 are included in an angular-velocity feedback control unit. The angular-velocity feedback control unit acts to control the steered angle velocity ωt so as to make the steered angle velocity ωt closer to the target steered angle velocity ωt* calculated by the PI control unit 45. The current deviation calculating unit 48 and the PI control unit 49 are included in a current feedback control unit. The current feedback control unit acts to control a motor current flowing through the steering operation motor 3 so as to make the motor current closer to the target two-phase current $I_{dq}$*, calculated by the PI control unit 47.

Figure 5:
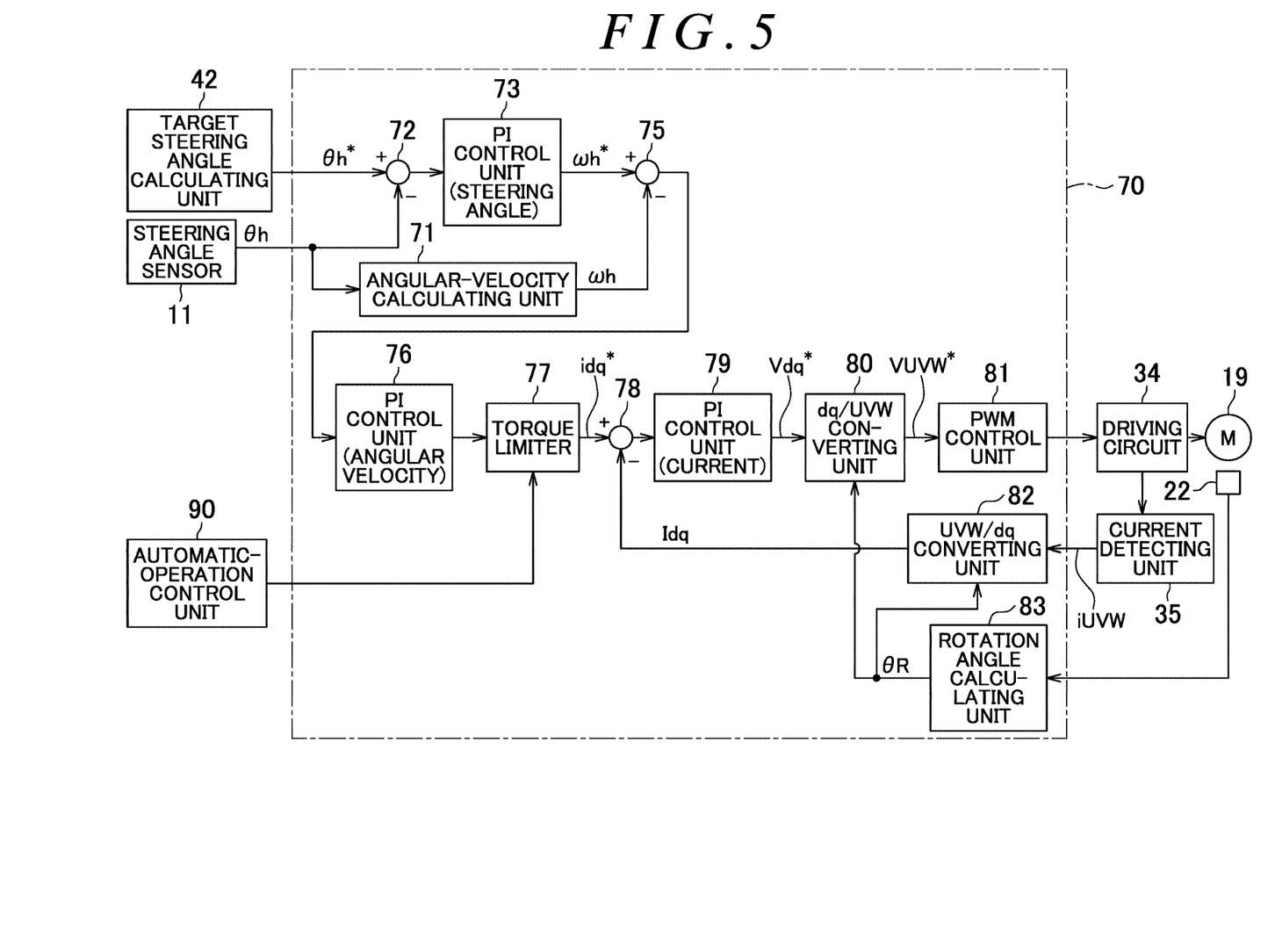
FIG. 5 is a block diagram illustrating a configuration example of a reaction force motor control unit.

FIG. 5 is a block diagram illustrating a configuration example of the reaction force motor control unit 70. The reaction force motor control unit 70 includes an angular-velocity calculating unit 71, an angular-deviation calculating unit 72, a PI control unit 73, an angular-velocity deviation calculating unit 75, a PI control unit 76, a torque limiter (current limiter) 77, a current deviation calculating unit 78, a PI control unit 79, a dq/UVW converting unit 80, a PWM control unit 81, a UVW/dq converting unit 82, and a rotation angle calculating unit 83.

The angular-deviation calculating unit 72 calculates a deviation $\Delta\theta h$ $(=\theta h*-\theta h)$ between the target steering angle $\theta h$* and the steering angle $\theta h$. The target steering angle $\theta h$* is calculated by the target steering angle calculating unit 42 in the steering operation motor control unit 40. The steering angle $\theta h$ is detected by the steering angle sensor 11. The PI control unit 73 executes PI calculation on the angular deviation $\Delta\theta h$ calculated by the angular-deviation calculating unit 72. Consequently, a target steering angle velocity ωh* is calculated which is a target value of a steering angle velocity. The target steering angle velocity ωh* calculated by the PI control unit 73 is provided to the angular-velocity deviation calculating unit 75.

The angular-velocity calculating unit 71 executes time differentiation on the steering angle $\theta h$ detected by the steering angle sensor 11 to determine an angular velocity (steering angle velocity) ωh of the steering angle $\theta h$. The steering angle velocity ωh calculated by the angular-velocity calculating unit 71 is provided to the angular-velocity deviation calculating unit 75. The angular-velocity deviation calculating unit 75 calculates a deviation $\Delta\omega h$ $(=\omega h*-\omega h)$ between the target steering angle velocity ωh* calculated by the PI control unit 73 and the steering angle velocity ωh calculated by the angular-velocity calculating unit 71.

The PI control unit 76 executes PI calculation on the angular-velocity deviation $\Delta\omega h$ calculated by the angular-velocity deviation calculating unit 75. Consequently, target currents are calculated which are target values of currents to be passed through the coordinate axes of the dq coordinate system. Specifically, the PI control unit 76 calculates a target d-axis current $i_d$* and a target q-axis current $i_q$* (hereinafter expressed as "target two-phase current $i_{dq}$*" when collectively referred to). More specifically, the PI control unit 76 calculates the target q-axis current $i_q$* such that the target q-axis current $i_q$* has a significant value, while setting the target d-axis current $i_d$* to zero. The target two-phase current $i_{dq}$* calculated by the PI control unit 76 is provided to the torque limiter 77.

The torque limiter 77 is controlled by the automatic-operation control unit 90. Specifically, the torque limiter 77 remains inactive in the normal mode. Therefore, in the normal mode, the target two-phase current $i_{dq}$* calculated by the PI control unit 76 is provided to the current deviation calculating unit 78 without any change. In the automatic operation mode, the torque limiter 77 is made active by the automatic-operation control unit 90. In the automatic operation mode, the torque limiter 77 limits the absolute value of the target two-phase current $i_{dq}$* (the absolute value of the target q-axis current $i_q$*) calculated by the PI control unit 76 to a preset limit value α or smaller. This is to limit a torque generated by the reaction force motor 19 in the automatic operation mode to a predetermined value or smaller. Therefore, in the automatic operation mode, the target two-phase current $i_{dq}$* subjected to the limiting process by the torque limiter 77 is provided to the current deviation calculating unit 78.

The rotation angle calculating unit 83 calculates the rotation angle (electrical angle; hereinafter referred to as the "rotor angle $\theta_R$") of the rotor of the reaction force motor 19 based on an output signal from the rotation angle sensor 22. The current detecting unit 35 detects a U-phase current $i_U$, a V-phase current $i_V$, and a W-phase current $i_W$ (hereinafter expressed as "three-phase detected current $i_{UVW}$" when collectively referred to). The three-phase detected current $i_{UVW}$ detected by the current detecting unit 35 is provided to the UVW/dq converting unit 82.

The UVW/dq converting unit 82 converts the three-phase detected current $i_{UVW}$ of the UVW coordinate system (the U-phase current $i_U$, the V-phase current $i_V$, and the W-phase current $i_W$) detected by the current detecting unit 33 into two-phase detected currents $i_d$ and $i_q$ of the dq coordinate system (hereinafter expressed as the "two-phase detected current $i_{dq}$" when collectively referred to). The currents are provided to the current deviation calculating unit 78. The rotor angle $\theta_R$, calculated by the rotation angle calculating unit 83, is used for the coordinate conversion in the UVW/dq converting unit 82.

The current deviation calculating unit 78 calculates a deviation between the target two-phase current $i_{dq}$* output from the torque limiter 77 and the two-phase detected current $i_{dq}$ provided by the UVW/dq converting unit 82. More specifically, the current deviation calculating unit 78 calculates the deviation of the d-axis detected current $i_d$ with respect to the target d-axis current $i_d$* and the deviation of the q-axis detected current $i_q$ with respect to the target q-axis current $i_q$*. The deviations are provided to the PI control unit 79.

The PI control unit 79 executes PI calculation on the current deviation calculated by the current deviation calculating unit 78. This results in a target two-phase voltage $v_{dq}$* (a target d-axis voltage $v_d$* and a target q-axis voltage $v_q$*) to be applied to the reaction force motor 19. The target two-phase voltage $v_{dq}$* is provided to the dq/UVW converting unit 80. The dq/UVW converting unit 80 converts the target two-phase voltage $v_{dq}$* into a target three-phase voltage $v_{UVW}$*. The rotor angle $\theta_R$ calculated by the rotation angle calculating unit 83 is used for this coordinate conversion. The target three-phase voltage $v_{UVW}$* is a combination of a target U-phase voltage $v_U$*, a target V-phase voltage $v_V$*, and a target W-phase voltage $v_W$*. The target three-phase voltage $v_{UVW}$* is provided to the PWM control unit 81.

The PWM control unit 81 generates a U-phase PWM control signal, a V-phase PWM control signal, and a W-phase PWM control signal having respective duties corresponding to the target U-phase voltage $v_U$*, the target V-phase voltage $v_V$*, and the target W-phase voltage $v_W$*, respectively, and supplies these PWM control signals to the driving circuit 34. The driving circuit 34 is a three-phase inverter circuit corresponding to the U-phase, the V-phase, and the W-phase. Power devices included in the inverter circuit are controlled using PWM control signals provided by the PWM control unit 81. Consequently, voltages corresponding to the target three-phase voltage $v_{UVW}^*$ are applied to stator windings for the respective phases in the reaction force motor 19.

The angular-deviation calculating unit 72 and the PI control unit 73 are included in an angle feedback control unit. The angle feedback control unit acts to control the rotation angle (steering angle) θh of the rotating shaft 10 so as to make the steering angle θh closer to the target steering angle θh* calculated by the target steering angle calculating unit 42. The angular-velocity deviation calculating unit 75 and the PI control unit 76 are included in an angular-velocity feedback control unit. The angular-velocity feedback control unit acts to control the steering angle velocity ωh so as to make the steering angle velocity ωh closer to the target steering angle velocity ωh*. The current deviation calculating unit 78 and the PI control unit 79 are included in a current feedback control unit. The current feedback control unit acts to control a motor current flowing through the reaction force motor 19 so as to make the motor current closer to the target two-phase current $I_{dq}^*$ output from the torque limiter 77.

In the normal mode, the target steering angle calculating unit 42 calculates the target steering angle θh*, which is a target value of the rotation angle of the rotating shaft 10, based on steering state detection values (in the present embodiment, the vehicle speed V, the steering torque Th, and the yaw rate Yr). The target steered angle calculating unit 43 calculates the target steered angle δ* based on the target steering angle θh*. The steering operation motor 3 is controlled so as to make the steered angle δ equal to the target steered angle δ*. The reaction force motor 19 is controlled so as to make the steering angle θh equal to the target steering angle θh*. Thus, the steering operation control and the reaction force control in accordance with operation of the steering wheel 2 are performed.

In the automatic operation mode, the automatic-operation control unit 90 sets the target steering angle θh* in the target steering angle calculating unit 42 in the steering operation motor control unit 40. The target steered angle calculating unit 43 calculates the target steered angle δ* based on the target steering angle θh* set by the automatic-operation control unit 90. The steering operation motor 3 is controlled so as to make the steered angle δ equal to the target steered angle δ*. Consequently, the wheels 5 are automatically steered. In other words, in the present embodiment, automatic operation for parking assistance is performed.

For the reaction force motor control unit 70, in the automatic operation mode, the torque limiter 77 limits the absolute value of the target two-phase current $i_{dq}^*$ (the absolute value of the target q-axis current $i_q^*$), calculated by the PI control unit 76, to the preset limit value α or smaller. Thus, during the automatic operation, the torque applied to the steering wheel 2 by the reaction force motor 19 is limited. This allows suppression of an unforeseen situation resulting from rotation of the steering wheel 2 during automatic operation.

Figure 6:
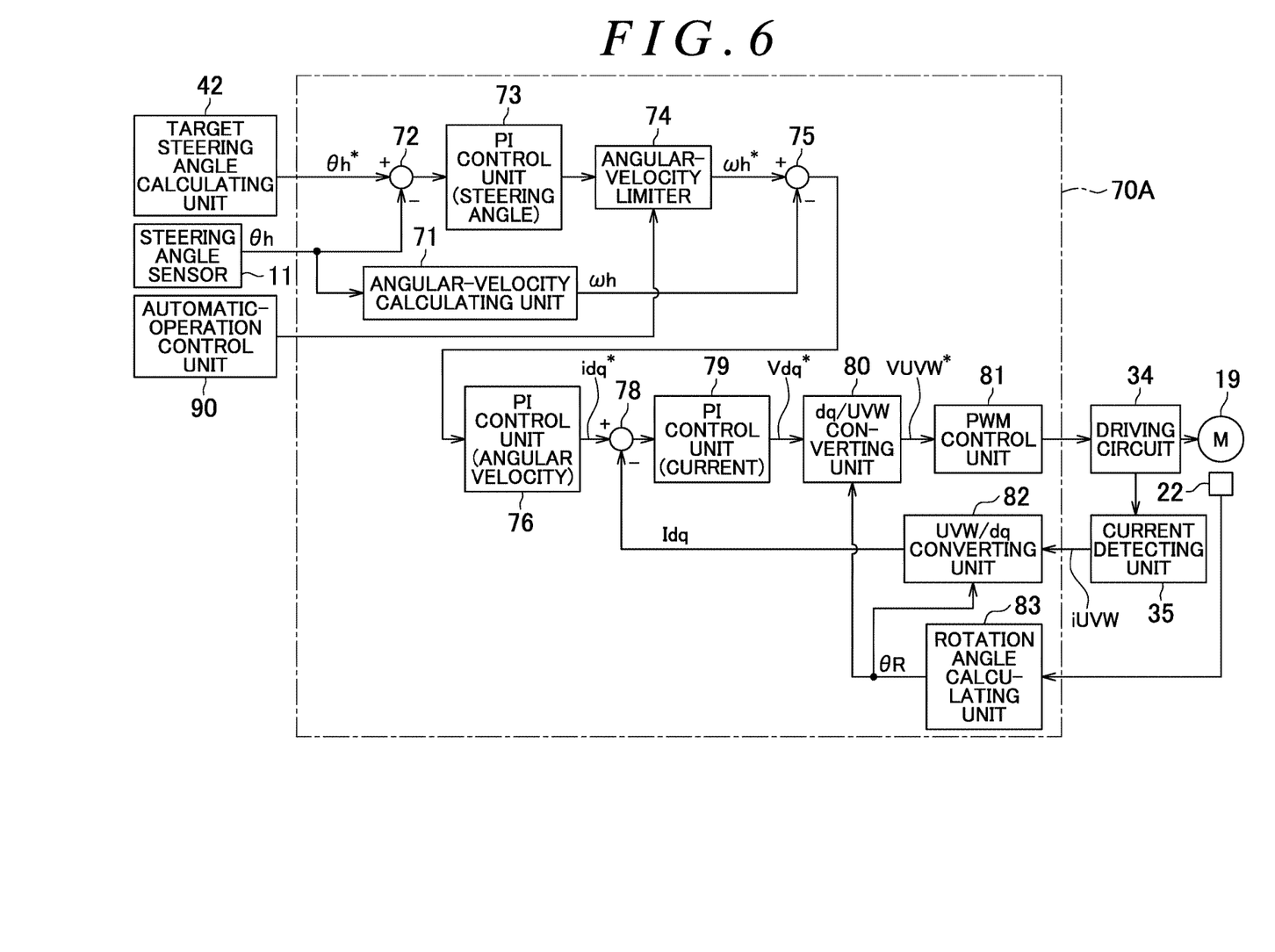
FIG. 6 is a block diagram illustrating another configuration example of the reaction force motor control unit.

FIG. 6 is a block diagram illustrating another configuration example of the reaction force motor control unit 70. Components in FIG. 6 that are similar to corresponding components in FIG. 5 described above are denoted by the same reference numerals as those in FIG. 5. A reaction force motor control unit 70A in FIG. 6 is different from the reaction force motor control unit 70 in FIG. 5 in that the torque limiter 77 is not provided downstream of the PI control unit 76. The reaction force motor control unit 70A in FIG. 6 is different from the reaction force motor control unit 70 in FIG. 5 in that an angular-velocity limiter 74 is provided downstream of the PI control unit 73. The reaction force motor control unit 70A in FIG. 6 is otherwise the same as the reaction force motor control unit 70 in FIG. 5.

The angular-velocity limiter 74 is limited by the automatic-operation control unit 90. Specifically, the angular-velocity limiter 74 remains inactive in the normal mode. Therefore, in the normal mode, the target steering angle velocity ωh*, calculated by the PI control unit 73, is provided to the angular-velocity deviation calculating unit 75 without any change. In the automatic operation mode, the angular-velocity limiter 74 is made active by the automatic-operation control unit 90. In the automatic operation mode, the angular-velocity limiter 74 limits the absolute value of the target steering angle velocity ωh* calculated by the PI control unit 73 to a preset limit value β or smaller. Therefore, in the automatic operation mode, the target steering angle velocity ωh* subjected to the limiting process by the angular-velocity limiter 74 is provided to the angular-velocity deviation calculating unit 75.

For the reaction force motor control unit 70A, in the automatic operation mode, the angular-velocity limiter 74 limits the absolute value of the target steering angle velocity ωh* calculated by the PI control unit 73 to the limit value β or smaller. Thus, during the automatic operation, the rotation speed of the reaction force motor 19 is limited to a predetermined value or smaller. Consequently, during the automatic operation, the rotation speed of the steering wheel 2 is also limited to a predetermined value or smaller. This allows suppression of an unforeseen situation resulting from rotation of a steering member during automatic operation.

The embodiment of the invention has been described. However, the invention may further be carried out in other forms. For example, in the above-described embodiment, the automatic-operation control unit 90 sets the target steering angle θh* in the target steering angle calculating unit 42 in the steering operation motor control unit 40 in the automatic operation mode. However, in the automatic operation mode, the automatic-operation control unit 90 may set the target steered angle δ* in the target steered angle calculating unit 43 in the steering operation motor control unit 40. In this case, one of the reaction force motor control unit 70, 70A and the steering operation motor control unit 40 may calculate the target steering angle θh* based on the target steered angle δ* set by the automatic-operation control unit 90, and provide the resultant target steering angle θh* to the angular-deviation calculating unit 72 in the reaction force motor control unit 70, 70A.

In the automatic operation mode, the automatic-operation control unit 90 may generate and set the target steered angle δ* in the target steered angle calculating unit 43 in the steering operation motor control unit 40, and generate and provide the target steering angle θh* to the angular-deviation calculating unit 72 in the reaction force motor control unit 70, 70A. In the above-described embodiment, the steering operation motor control unit 40 calculates the target steering angle θh* based on the steering state detection values such as the vehicle speed V, the steering torque Th, and the yaw rate Yr, and then calculates the target steered angle δ* based on the resultant target steering angle θh*. However, the steering operation motor control unit 40 may directly calculate the target steered angle δ* based on the steering state detection values. In this case, the reaction force motor control unit 70, 70A calculates the target steering angle θh* based on the target steered angle δ* calculated by the steering operation motor control unit 40. Alternatively, the reaction force motor control unit 70, 70A calculates the target steering angle θh* based on the steering state detection values. The resultant target steering angle θh* may be provided to the angular-deviation calculating unit 72.

In the above-described embodiment, the vehicle speed V, the steering torque Th, and the yaw rate Yr are used as the steering state detection values to calculate the target steering angle θh* (target steered angle δ*). However, the steering state detection values are not limited to these detection values. In the above-described embodiment, the target steered angle velocity ωt* is calculated based on the deviation between the target steered angle δ* and the steered angle δ, and the target current $I_{dq}$* is calculated based on the deviation between the target steered angle velocity ωt* and the steered angle velocity ωt. However, the steering operation motor control unit 40 may calculate the target current $I_{dq}$* based on the deviation between the target steered angle δ* and the steered angle δ. In this case, the PI control unit 45, the angular-velocity deviation calculating unit 46, and the PI control unit 47 in FIG. 4 may be configured as a single PI control unit.

The above-described reaction force motor control unit 70 in FIG. 5 calculates the target steering angle velocity ωh* based on the deviation between the target steering angle θh* and the steering angle θh, and calculates the target current $i_{dq}$* based on the deviation between the target steering angle velocity ωh* and the steering angle velocity ωh. However, the reaction force motor control unit 70 may calculate the target current $i_{dq}$* based on the deviation between the target steering angle θh* and the steering angle θh. In this case, the PI control unit 73, the angular-velocity deviation calculating unit 75, and the PI control unit 76 in FIG. 5 may be configured as a single PI control unit.

Various changes may be made to the embodiment within the scope of the matters recited in the claims.

What is claimed is:

1. A vehicular steering system comprising:
   a steering member configured to steer a vehicle, the steering member being mechanically separate from a steering operation mechanism, the steering operation mechanism being driven by a steering operation motor;
   a reaction force motor configured to apply a reaction force to the steering member; and
   a reaction force motor control unit configured to limit a current flowing through the reaction force motor to a predetermined value or smaller while in an automatic operation mode such that movement of the steering member by the reaction force motor is suppressed while in the automatic operation mode, the automatic operation mode providing an automatic operation of the steering operation mechanism performed by an automatic-operation control unit.

2. The vehicular steering system according to claim 1, wherein the automatic operation is a parking assistance.

3. A vehicular steering system comprising:
   a steering member configured to steer a vehicle, the steering member being mechanically separate from a steering operation mechanism, the steering operation mechanism being driven by a steering operation motor;
   a reaction force motor configured to apply a reaction force to the steering member; and
   a reaction force motor control unit configured to limit a rotation speed of the reaction force motor to a predetermined value or smaller while in an automatic operation mode such that movement of the steering member by the reaction force motor is suppressed while in the automatic operation mode, the automatic operation mode providing an automatic operation of the steering operation mechanism performed by an automatic-operation control unit.

4. The vehicular steering system according to claim 3, wherein the automatic operation is a parking assistance.

* * * * *